United States Patent
Zabback et al.

(10) Patent No.: US 7,877,374 B2
(45) Date of Patent: Jan. 25, 2011

(54) STATISTICS ADJUSTMENT TO IMPROVE QUERY EXECUTION PLANS

(75) Inventors: Peter A. Zabback, Kirkland, WA (US); Ian Jose, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 11/566,076

(22) Filed: Dec. 1, 2006

(65) Prior Publication Data
US 2008/0133458 A1   Jun. 5, 2008

(51) Int. Cl.
*G06F 17/30* (2006.01)
(52) U.S. Cl. .................. 707/713; 707/688; 707/719
(58) Field of Classification Search .............. None
See application file for complete search history.

(56) References Cited

U.S. PATENT DOCUMENTS

| | | | |
|---|---|---|---|
| 6,029,163 A | 2/2000 | Ziauddin | |
| 6,272,487 B1 | 8/2001 | Beavin et al. | |
| 6,353,821 B1 | 3/2002 | Gray | |
| 6,477,523 B1 | 11/2002 | Chiang | |
| 6,691,099 B1 * | 2/2004 | Mozes | 707/2 |
| 6,738,755 B1 | 5/2004 | Freytag et al. | |
| 7,035,843 B1 | 4/2006 | Bellamkonda et al. | |
| 7,299,248 B2 * | 11/2007 | Popivanov | 707/200 |
| 2004/0181521 A1 | 9/2004 | Simmen | |
| 2005/0050041 A1 | 3/2005 | Galindo-Legaria et al. | |
| 2005/0097078 A1 | 5/2005 | Lohman et al. | |
| 2005/0131914 A1 | 6/2005 | Abdo et al. | |
| 2005/0267877 A1 | 12/2005 | Chaudhuri et al. | |
| 2006/0031189 A1 * | 2/2006 | Muras et al. | 707/2 |
| 2008/0133454 A1 * | 6/2008 | Markl et al. | 707/2 |

OTHER PUBLICATIONS

V. Markl, et al. LEO: An autonomic query optimizer for DB2. IBM Systems Journal, vol. 42, No. 1, 2003. http://www.research.ibm.com/journal/sj/421/markl.pdf, Last accessed Sep. 12, 2006.
Nicolas Bruno, et al. Efcient Creations of Statistics over Query Expressions. http://www.cs.brown.edu/courses/cs227/Papers/AutoAdmin/buildsits.pdf. Last Accessed Sep. 12, 1006.
Ning Zhang, et al. XSEED: Accurate and Fast Cardinality Estimation for XPath Queries. http://softbase.uwaterloo.ca/~ddbms/publications/xml/TR-CS-2005-22.pdf. Last accessed Sep. 12, 2006.

* cited by examiner

*Primary Examiner*—Hung Q Pham
(74) *Attorney, Agent, or Firm*—Turocy & Watson, LLP (57) ABSTRACT

A query execution system is provided. The system includes a monitor component that detects data value changes in a database. An adjustment component initiates an intermediate query in view of detected data value changes, the intermediate query employed to adjust statistics related to a query plan optimization.

15 Claims, 10 Drawing Sheets

STATISTICS ADJUSTMENT TO IMPROVE QUERY EXECUTION PLANS

BACKGROUND

Structured Query Language (SQL) is a popular computer language employed to create, modify, retrieve and manipulate data from relational database management systems. In general, the SQL language has evolved beyond its original scope to support object-relational database management systems, for example. Another type of query language includes language integrated query (LINQ) which applies to a set of operating system framework extensions that encompass language-integrated query, set, and transform operations. For example, these framework extensions can extend C# and Visual Basic with native language syntax for queries and provide class libraries to take advantage of these capabilities. These and other query languages such as SQL fall under the broad umbrella of relational database systems.

In relational database systems, an optimizer is a module that builds a plan of how a query will be executed. Related to this concept is query cardinality estimation that plays an important role in the query optimization process. Inaccurate cardinality estimation can lead to suboptimal plans being selected, where execution times between optimal and suboptimal plans may differ by orders of magnitude. The problem of query cardinality estimation is important for database systems, since query optimizers need accurate estimates of the sizes of intermediate result sets with respect to hypothetical query plans for the query. Query optimizers use size estimation methods to select a better query execution plan among numerous candidates. A query plan is, typically, a tree, where the estimation methods are usually called for each node of the tree. In order to estimate the outgoing data flow of each node, it is necessary to estimate the sizes of its sub-tree's data flow, which is the incoming flow for the node. Accuracy of estimation is important since compound error in estimation grows exponentially with respect to the number of join operations in a query, for example.

Another application for query cardinality estimation is with respect to sophisticated user interfaces. They provide an estimation of the query result size to the user before the actual query execution, where such information can help a system or administrator to allocate the right amount of memory for an application or to detect misconceptions about the query or the data. Such interfaces can also depend on the accuracy of the size estimation.

There are many effective statistical solutions for estimation problems. However, virtually none of them can be applied to the query size estimation problem. The reasons for this follow from the typical relational database architecture. For instance, at the optimizer stage, various query execution plans are considered. The optimizer generally selects one—hopefully a near optimal plan, for query execution. The optimizer is also a part of a static compilation, where the underlying data is not accessed at this stage. The goal of the optimizer is to select a suitable plan for execution, where the chosen plan may be not the absolute best, since the problem of finding the best plan may not be worth the time it takes, but it should be ultimately an acceptable plan. Expensive plans (to execute) should be avoided by the optimizer however.

The cost of the plan generally depends on the intermediate cardinalities in the plan nodes. This is why knowledge of intermediate query cardinalities in the query tree is employed for pruning among plans. The specifics of the query cardinality estimation problem in relational database systems are that the information should be available to the query optimizer at the query compilation stage. Another requirement is that query compilation should take a negligible percentage of the query processing time, and, in particular, the optimization time should be low. The data set is typically large and does not fit in main memory, and most of the data resides on the disk. Scanning the data requires multiple disk accesses, which can involve high I/O costs. Therefore, scanning the data is generally too expensive, and is usually avoided in the compilation stage. (Sampling-based techniques are an exception as they do access the data). Information about the underlying data distributions should be provided to the optimizer without need to access the data itself. In commercial database systems, histograms and other statistics are stored in catalog tables, created and maintained by the system for its own use.

During the query compilation stage, metadata is loaded into designated internal data structures. The statistics stored for optimization should be as compact as possible in order to use little of the main memory. The statistics are updated periodically and incrementally, usually off-line, using as few re-scans of data as possible. This makes usage of many existing statistical methods, applicable in other areas, inappropriate for the query cardinality estimation problem.

Ascending descending database column values are common in many applications (e.g., increasing order numbers, customer ids, date/time set to current date/time, and so forth). However, these type ascending (or descending) values pose a hard problem to optimizer statistics and cardinality estimation. Statistics generated on these columns are soon out-of-date since all new values are by definition outside of the known range of the statistics (e.g., histogram). In addition, it is very common to query for new values, where typical queries inquire for values which are often outside of the known range. This leads to poor cardinality estimates which can lead to slow execution plans.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Query plan optimization components are provided to facilitate that statistics relating to dynamic data changes are detected over time and employed for subsequent query optimizations. Database records are refreshed on an ongoing basis, where statistics are maintained that enable query plan optimizers to develop efficient query plans for query execution. Some types of stored data, referred to as ascending or descending column data, often change faster than the resultant statistics can be updated or refreshed, which can lead to less than optimal query plan execution. Such ascending or descending column data is often changing and outside of known ranges for such data. For instance, employee identification numbers, dates, times, accumulated events, and so forth by nature can have a continual ascending or descending quality to the respective data. The query plan optimization components first detect when data has an ascending or descending quality, tag or mark database columns to indicate this quality, and then initiate small intermediate queries to adjust statistics relating to such qualities. When the adjustments have been performed, query plans can be generated/executed in a more reliable, accurate, and efficient manner.

In one aspect, a monitor component detects when database records or columns have changed over time. This is achieved by comparing stored database statistics with data retrieved from a recent statistics refresh operation. If the data compared is determined to be outside of a known range, this particular column is monitored to determine if an ascending or descending data trend has been detected. For example, if after several consecutive readings (e.g., 3 readings showing an ascending or descending trend), an ascending or descending trend has been detected from the comparison operations, the respective column where the data has been determined to be ascending or descending is then marked or flagged as having such characteristics. In the future, and during a refresh operation, a small, intermediate query can be executed by an adjustment component to retrieve the most recent data for an ascending or descending column that has been flagged as such, where a statistics adjustment can be made to update the column statistics with the most recent high value for an ascending column or the most recent low value for a descending column. By employing the recently updated column for the query, statistics more accurately reflect the actual data in the column and resulting query plans can be optimized.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A query plan optimization and execution system is provided that employs automatically detected data changes to update statistics in order to facilitate more efficient execution of query plans. In one aspect, a query execution system is provided. The system includes a monitor component that detects data value changes in a database. An adjustment component initiates an intermediate query in view of detected data value changes, the intermediate query employed to adjust statistics related to a query plan optimization.

As used in this application, the terms "component," "query," "monitor," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
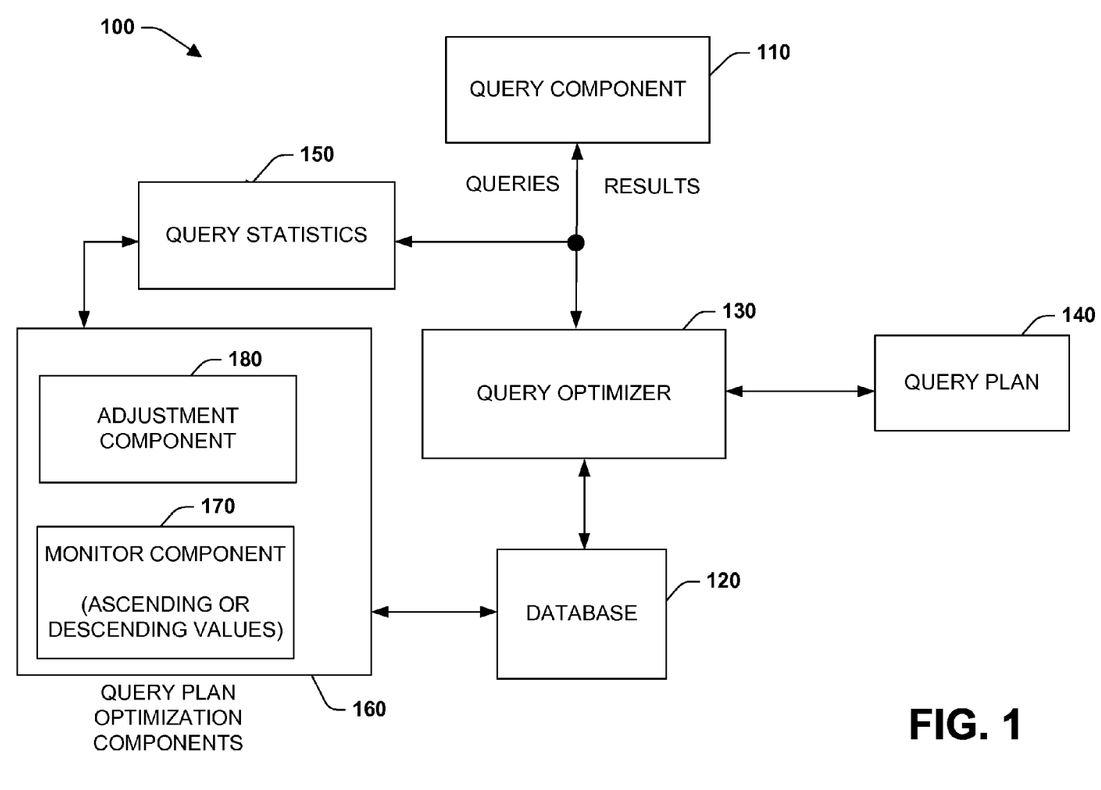
FIG. 1 is a schematic block diagram illustrating a query plan optimization and execution system.

Referring initially to FIG. 1, a query execution system 100 is illustrated for query execution and query plan optimization. The system 100 includes a query component 110 that provides engines, interfaces, instructions, and class functionality to perform query operations on an input database 120 (or data collection). The query component 110 includes at least one engine (not shown) for processing the database 120 and interacting with a query optimizer 130 that generates a query execution plan 140 (or query plan) to optimize execution of a given query by selecting a plan 140 from one or more possible determined plans. As shown, a set of query statistics 150 can be maintained to facilitate query plan 140 optimization. In general, the query statistics 150 are refreshed over time to facilitate optimal query plan 140 generation and execution. It is noted that the database 120 can be processed with substantially any relational database programming language adapted with the optimization concepts described herein (e.g., SQL, XLST, LINQ, Visual Basic, C, and so forth).

One or more query plan optimization components 160 are provided to facilitate that query statistics 150 relating to dynamic data changes are detected over time and employed for subsequent query optimizations at 130. Database records are refreshed on an ongoing basis, where statistics at 150 are maintained (statistics can also be maintained inside the database) that enable the query plan optimizer 130 to develop efficient query plans 140 for query execution. Some types of stored data at 120 often change faster than the resultant query statistics 150 can be updated or refreshed which can lead to less than optimal query plan execution. Such data is referred to as ascending or descending column data that is often changing and outside of known ranges for such data. For instance, identification numbers, dates, times, accumulated events, and so forth by nature can have a continual ascending or descending quality to the respective data. The query plan optimization components 160 first detect when data has an ascending or descending quality, tag or mark database columns to indicate this quality, and then initiate small intermediate queries to adjust the query statistics 150 relating to such qualities. When the adjustments have been performed, query plans 140 can be generated/executed in a more reliable, accurate, and efficient manner.

In one aspect, the query plan optimization components 160 include a monitor component 170 that detects when database 120 records or columns have changed over time. This is achieved by comparing stored database statistics 150 with data retrieved from a recent statistics refresh operation by the query plan optimizer 130. If the data compared is determined to be outside of a known range, this particular column is monitored to determine if an ascending or descending data trend has been detected. For example, if after several consecutive readings (e.g., 2 or more readings showing an ascending or descending trend), an ascending or descending trend has been detected from the comparison operations, the respective column where the data has been determined to be ascending or descending is then marked or flagged as having such characteristics. In the future, and during a cardinality estimation, a small, intermediate query can be executed by an adjustment component 180 to retrieve the most recent data for an ascending or descending column that has been flagged as such, where a statistics adjustment can be made to update the column statistics at 150 with the most recent high value for an ascending column or the most recent low value for a descending column. By employing the recently updated column for the query, statistics more accurately reflect the actual data in the column and resulting query plans 140 can be optimized.

Generally, many relational database engines use some sort of histograms to describe the data distribution of columns in a table, for example. These histograms can be used during query optimization at 130 to estimate the number of qualifying rows (cardinality) of individual relational operators. Histogram statistics 150 can be calculated upfront and used for cardinality estimation when a query predicate references the associated table column. These column statistics approximate the actual data distribution. The approximation is essentially twofold: the distribution of millions of rows is approximated into several hundred histogram buckets (or steps), for example. Any changes to the data after the statistics are calculated may not be reflected in the histogram. The second approximation is usually overcome by frequent statistics refreshes. For this purpose the database engine tracks the number of changes to a column after statistics 150 are calculated and refreshes the statistics when the number of changes crosses a certain threshold. Depending on the application logic and the underlying data distribution, such refresh mechanism can be substantially inaccurate. In one case of data distributions, new values inserted are ascending (or descending) in nature. This generally implies that statistics calculated on a column do not properly reflect the distribution of values inserted after the statistics 150 were created. This may be generally true no matter how aggressively statistics are refreshed.

In order to address the ascending or descending data distribution problem in the database 120, the query plan optimization components 160 generally perform a detection phase via the monitor component 170, and an adjustment phase via the adjustment component 180. As noted above, the monitor component 170 provides ascending or descending key detection. Thus, when column statistics at 150 are refreshed, the monitor component compares old and new statistics and then estimates how many rows were inserted above a known max (or min) value of the old histogram since the histogram was created. If the majority of new values (determined by threshold) are above the known maximum (or below minimum) and this trend is detected over several statistics updates, the column is considered ascending (or descending if known minimums are detected).

When an ascending or descending trend has been detected at 170, statistics adjustments are provided via the adjustment component 180. For instance, if the query optimizer 130 processes an ascending (or descending) key column during query compilation (optimization), the system 100 can dynamically execute a simple select query to determine the current maximum (or minimum) value for the respective column. This maximum value (along with the number of changes since the last statistics update) is then employed to amend the existing histogram (or other data structure) at 150. Thus, this dynamic updating improves cardinality estimation for predicates on ascending or descending key columns. Before proceeding, it is noted that the system 100 can be provided as a system to process and execute queries, where the queries can be processed and executed by substantially any type of relational database, engine, and/or language. Thus, the system 100 can include means for monitoring (e.g., monitor component 170) query statistics to determine an ascending or descending trend in the statistics. The system can also include means for adjusting (adjustment component 180) the statistics in view of the determined ascending or descending trend observed in the statistics.

FIGS. 2, 3, 4, 7, and 8 illustrate exemplary processes for querying and optimizing statistical data. While, for purposes of simplicity of explanation, the processes are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Figure 2:
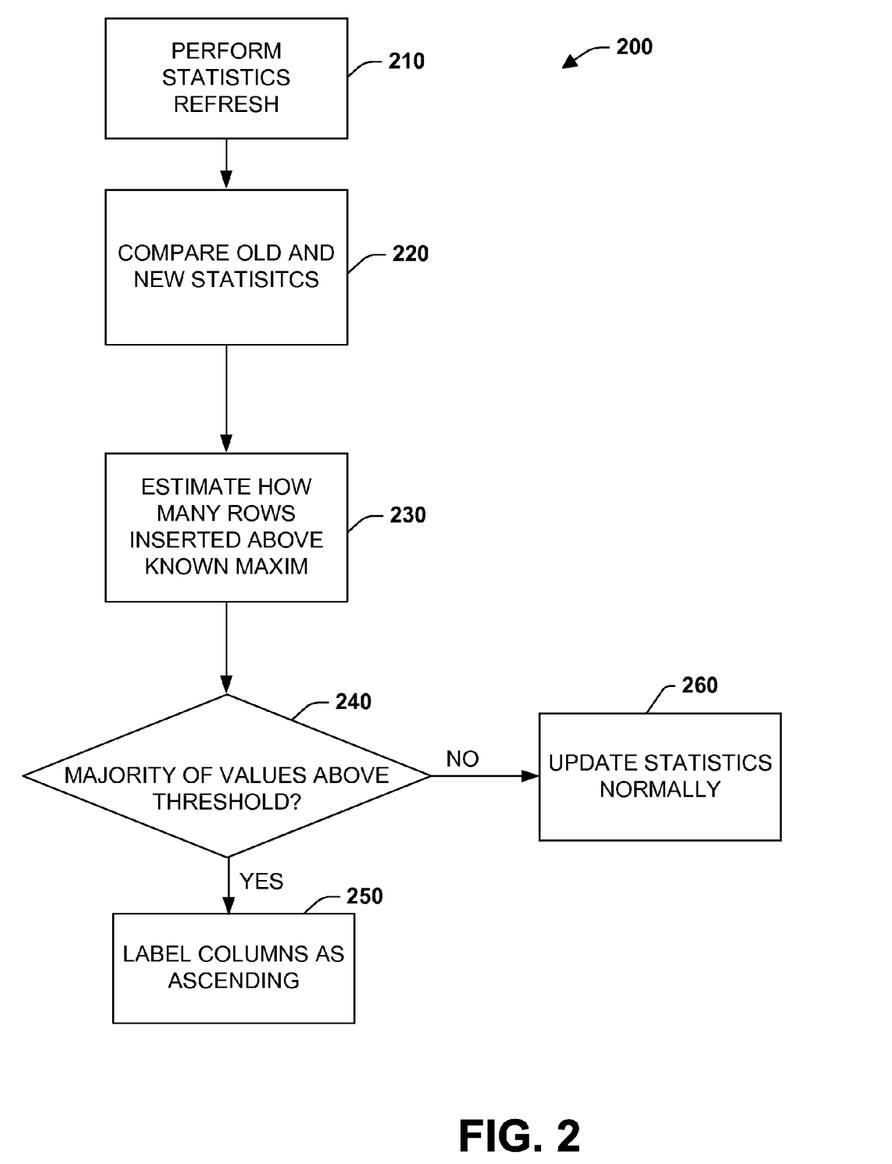
FIG. 2 is a flow diagram that illustrates a process for detecting ascending column statistical data.

FIG. 2 illustrates a process for detecting an ascending statistical property of data. Proceeding to 210 of FIG. 2, one or more statistics refresh operations are performed, where refresh relates to updating statistics relating to one or more database columns. At 220, when column statistics are refreshed, previously determined statistics and new statistics are compared. This can include basic mathematical operations such as subtraction between two quantities to detect differences. Other operations include counting the number of rows that have been added or deleted from database records, for example. At 230, an estimate is performed on the statistics to determine how many rows were inserted above a known maximum value of a previous histogram (or other type of record) since the previous histogram was created. At 240, if the majority of new values (determined by threshold value) is above a known maximum (determined by threshold value), and a trend is considered detected over several statistics updates (predetermined threshold for number of times), then the column is considered ascending and marked as such at 250. If no such trend is detected at 240, then statistics are updated normally for the respective columns at 260.

Figure 3:
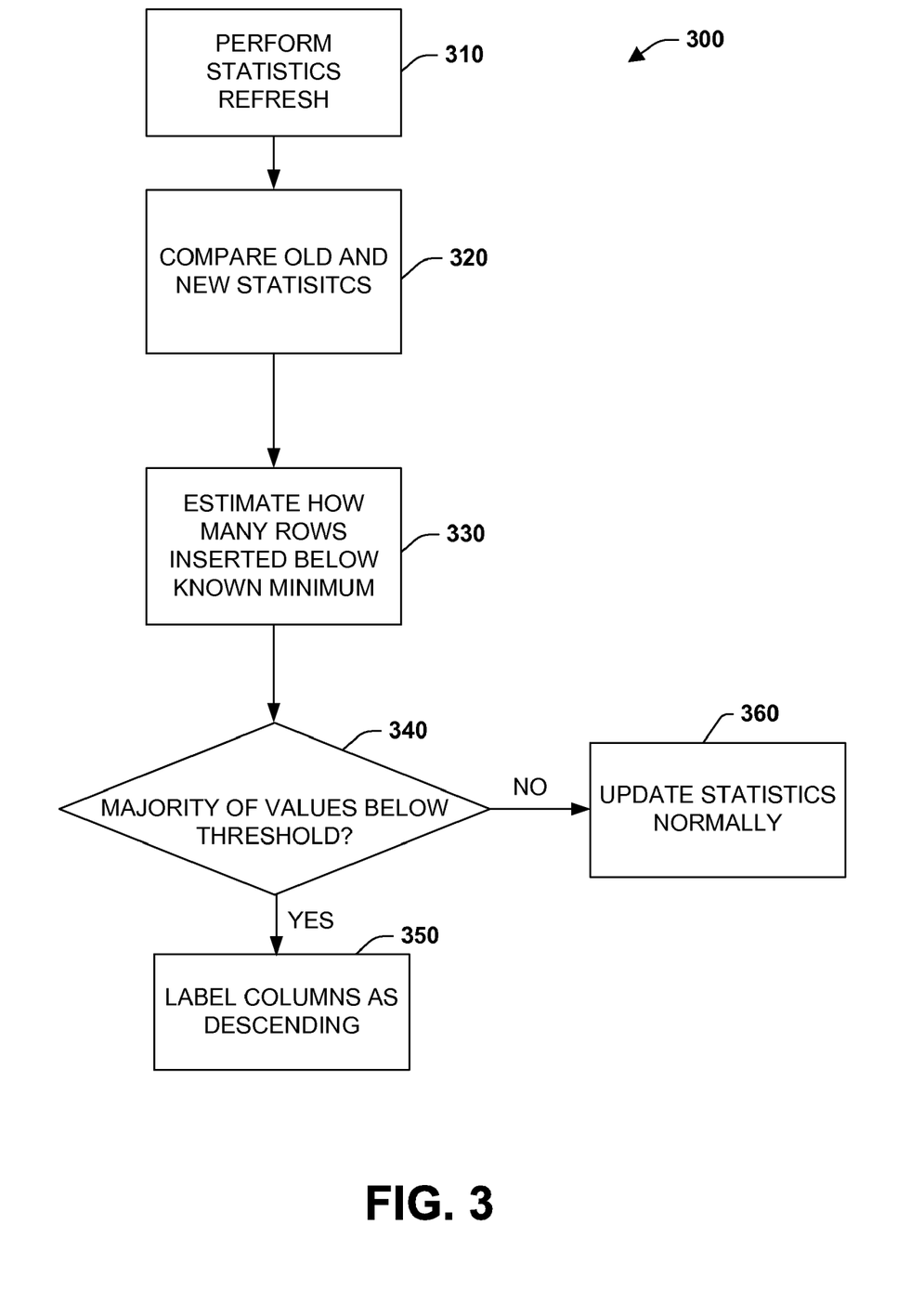
FIG. 3 is a flow diagram that illustrates a process for detecting descending column statistical data.

Referring now to FIG. 3, a process 300 illustrates processing for detecting descending column data. Proceeding to 310 of FIG. 3, and similar to the process 200 depicted above with respect top FIG. 2, one or more statistics refresh operations are performed, where refresh relates to updating statistics relating to the columns. At 320, as column statistics are refreshed, previously determined statistics and new statistics are compared, where processing operations can include similar operations as described above with respect to FIG. 2. At 330, an estimate is performed on the statistics to determine how many rows were inserted below a known minimum value of the previous histogram (or other type of record) since the previous histogram was created. For example, in the case of ascending values detected by the process 200 above, data inserts can be treated as though they came after the present distribution. In the case of descending keys detected by the process 300, inserts can be treated or processed as though they came before the present data distribution. In another case, deleted entries can be processed as though they have been evenly distributed (or substantially even) through the distribution including the newly added values.

The process 200 and/or 300 can be employed to determine the current low value and values found to be absent at the opposite end of a range and can be used to reduce the number of deletes applied generally through the remaining statistical distribution. For example, these processes can be employed in the case of tables acting as queues where data is added at the end and deleted at the beginning. Proceeding to 340 of FIG. 3, if the majority of new values (determined by threshold value) is below a known minimum (determined by threshold value), and a trend is considered detected over several statistics updates (predetermined threshold for number of times), then the column is considered descending and marked as such at 350. If no such trend is detected at 340, then statistics are updated normally for the respective columns at 360.

Figure 4:
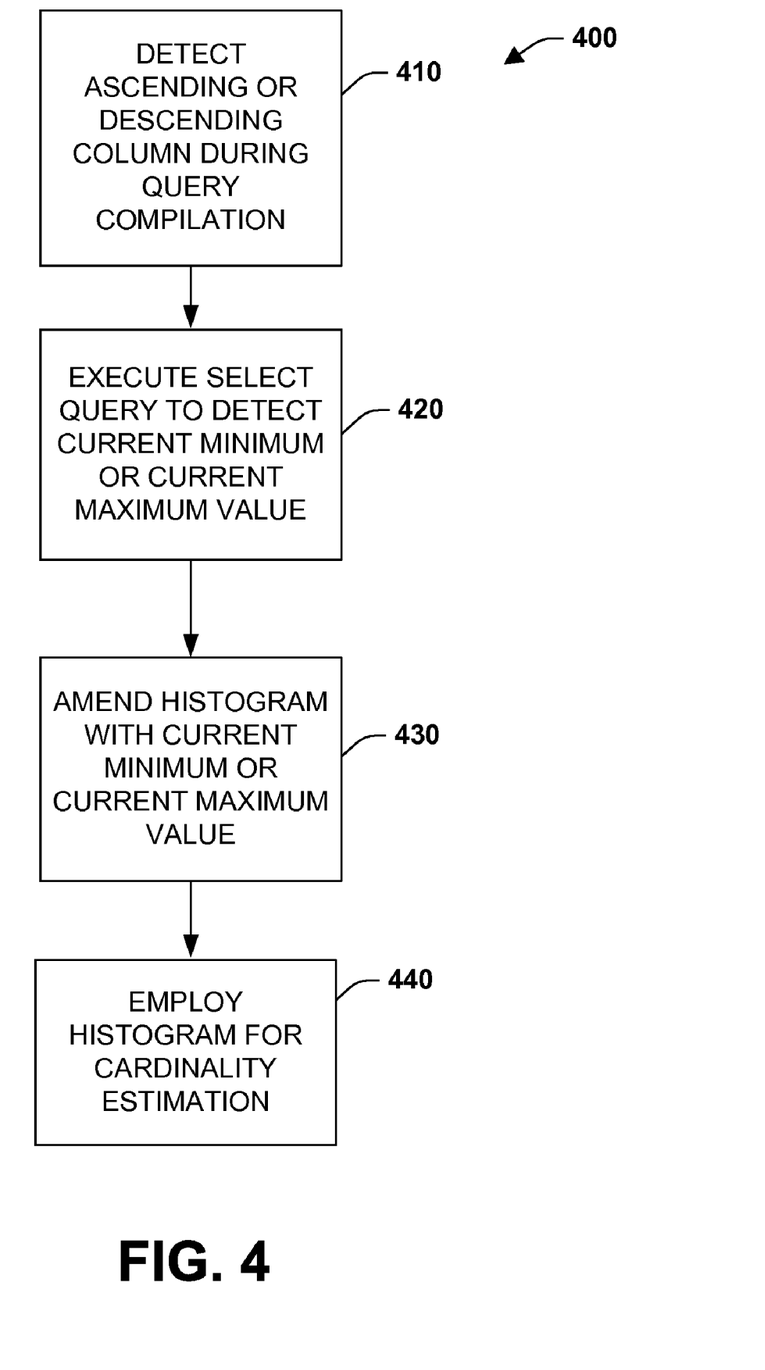
FIG. 4 illustrates a statistics adjustment process which can be applied after ascending or descending data detection processes have been executed.

Turning to FIG. 4, a statistics adjustment process 400 is illustrated which can be applied after the ascending or descending data detection processes 200 and 300 described above have been executed. After the processes 200 and 300 have executed, and as previously noted, statistical columns may be labeled, marked, or flagged, as having ascending or descending data characteristics. Thus, proceeding to 410 of the process 400, if an optimizer detects an ascending (or descending) key column (as noted by a previous labeling of the column) during query compilation (optimization), then the system dynamically executes a simple select query at 420 to determine a current maximum value of this column for ascending values or a current minimum value for a detected descending column. At 430, the current maximum or minimum value derived from the select query (along with the number of changes since the last statistics update) is employed to amend the existing histogram (or other statistical quantity). This execution of the intermediate query improves cardinality estimation for predicates on ascending or descending key columns. Thus, at 440, the updated histogram is employed for cardinality estimation in the context of a query optimization routine.

Figure 5:
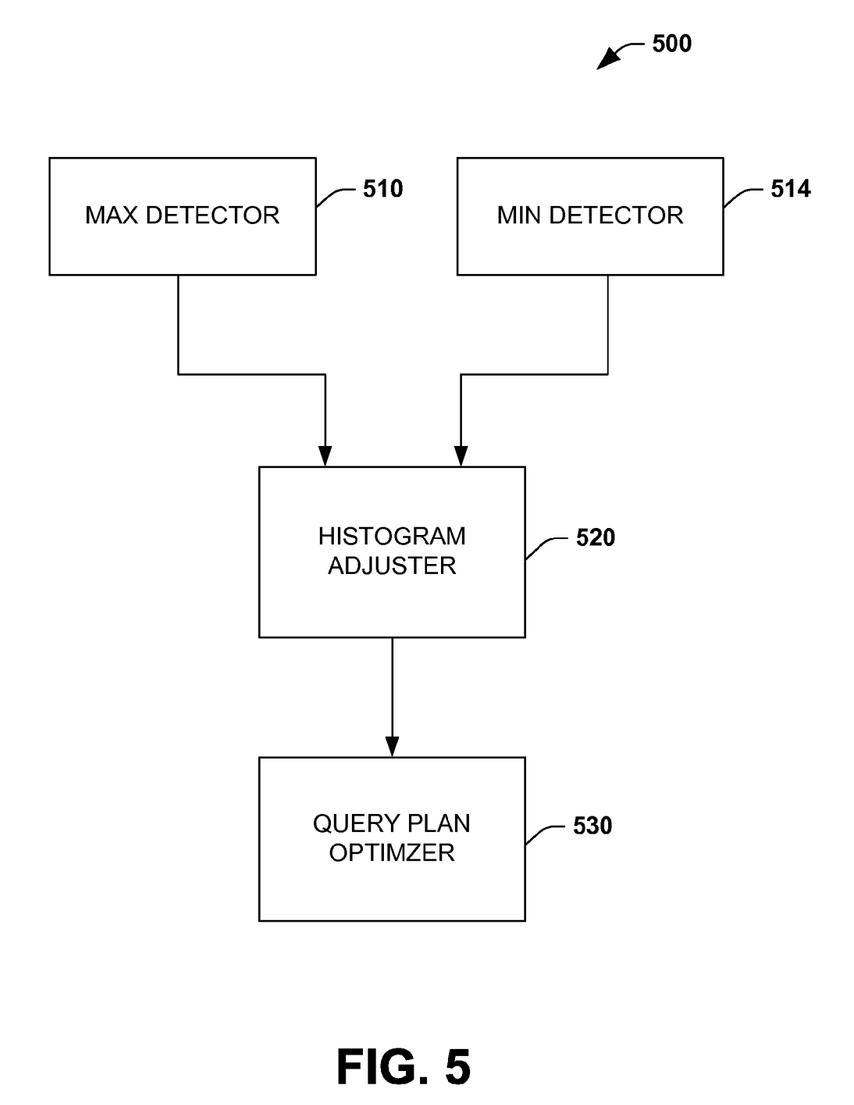
FIG. 5 illustrates an example system for processing query statistics.

FIG. 5 illustrates an example system 500 for processing query statistics. In this aspect, it is shown how duplicate processes can preprocess statistical data, before adjusting such data in view of the pre-processing. A maximum (max) detector is show at 510 and a minimum detector 514 can be run as single processes, parallel processes, sequential processes, and/or as stand alone processes. Similar to what was described above with respect to FIGS. 2 and 3, the max detector 510 is utilized to detect a trend in data over time that is ascending or increasing in nature. If such trend is detected, the max detector 510 labels or marks columns associated with the ascending data for later processing. Similarly, the min detector 514 is employed to detect data values that are descending in nature and marks or flags columns if a descending trend is detected over time (e.g., after four consecutive refresh operations and ascending or descending trend data is detected, update metadata flag for the detected column that column is to be adjusted during later query processing).

As shown, a histogram adjuster 520 is provided to sample column flag or metadata and determine whether or not a column has been tagged as having ascending or descending data qualities or characteristics. If a column is determined to be ascending or descending, then the histogram adjuster initiates a small, intermediate query to retrieve the latest or current max/min value for the respective column. The retrieved value is then employed to update statistics for that column before the statistics are then employed by query plan optimizer at 530. After a query plan has been selected by the optimizer, a resultant query can be executed to retrieve desired data in response to a given query.

Figure 6:
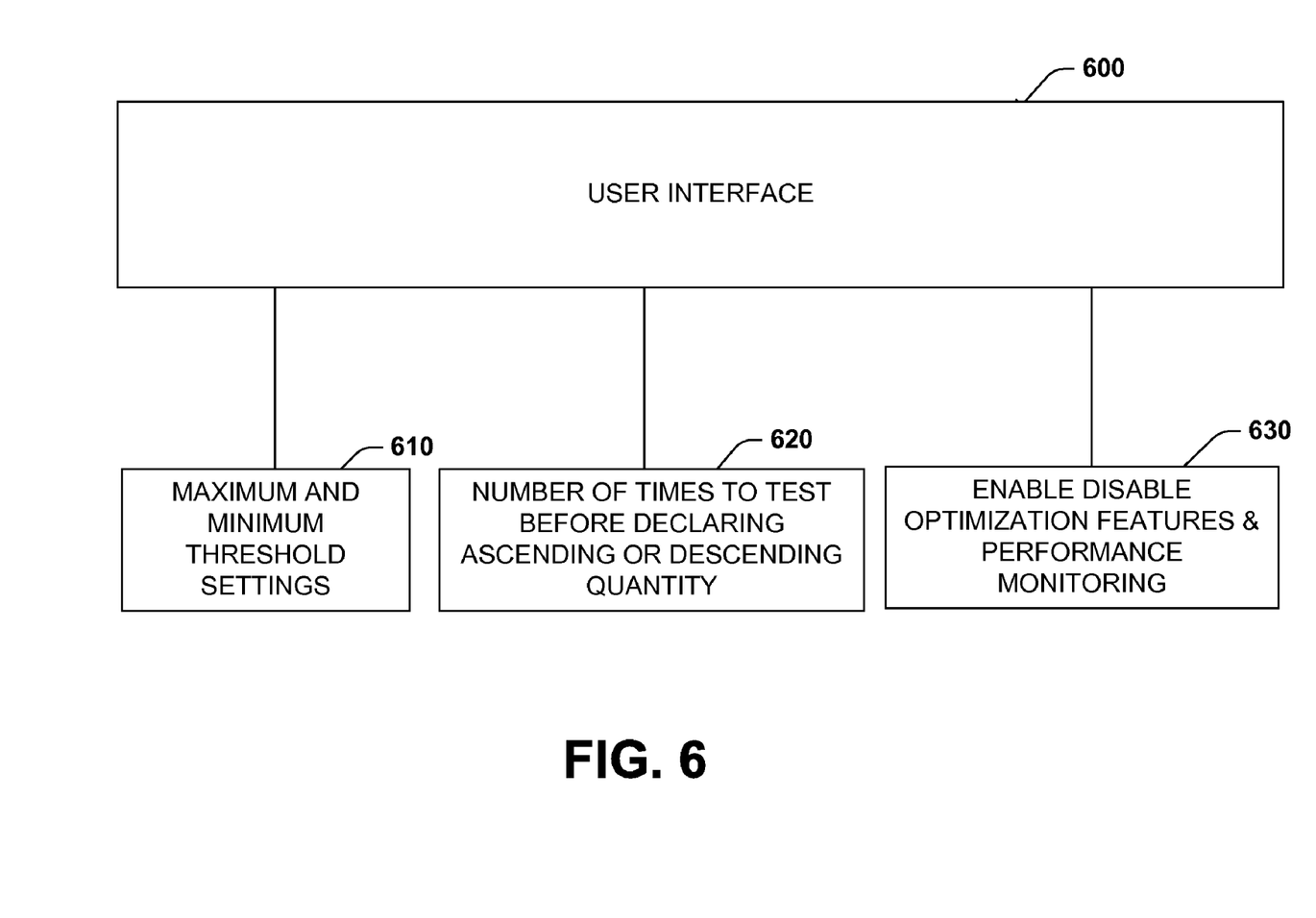
FIG. 6 illustrates an alternative aspect where a user interface can be provided to adjust various parameters with respect to ascending/descending column detection, adjustment, and/or performance.

Referring to FIG. 6, an alternative aspect is shown where a user interface 600 can be provided to adjust various parameters with respect to ascending column detection, adjustment, and/or performance. In addition to various hardware and/or software components employed to process queries, various interfaces 600 can be provided to manipulate ascending or descending key detection and adjustment processes where various examples are illustrated in more detail below with respect to FIGS. 7 and 8. This can include a Graphical User Interface (GUI) 600 to interact with the parameters or other components of a query execution process such as any type of application that sends, retrieves, processes, and/or manipulates query or statistical data, receives, displays, formats, and/or communicates data, and/or facilitates operation of the components described herein. For example, such interfaces 600 can also be associated with an engine, server, client, administrative tool or web browser although other type applications can be utilized.

In one aspect, minimum and maximum threshold settings can be adjusted at 610. These parameters can be employed to signal when statistics data has reached a maximum or minimum value such that the data should be tagged as ascending or descending. At 620, another type of threshold that can be set is how many passes or the number of times a detection algorithm needs to observe trend data before actually declaring such a trend and subsequently labeling a column as such. Still yet another threshold relates to how many new values have been observed as having ascending or descending qualities before a trend in the values is declared. As can be appreciated, the user interface 600 may be employed by administrative personnel to adjust and monitor performance of statistical updating specifically and query plan optimization in general. Thus, another adjustable feature may include controls for enabling or disabling optimization components within the system at 630 (e.g., disable descending optimization algorithms) and provide display outputs for monitoring query plan execution and/or performance.

Before proceeding, it is noted that the interface 600 or GUI can include a display having one or more display objects (not shown) for manipulating/monitoring algorithm performance/characteristics including such aspects as configurable icons, buttons, sliders, input boxes, selection options, menus, tabs and so forth having multiple configurable dimensions, shapes, colors, text, data and sounds to facilitate operations with the model. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Figure 7:
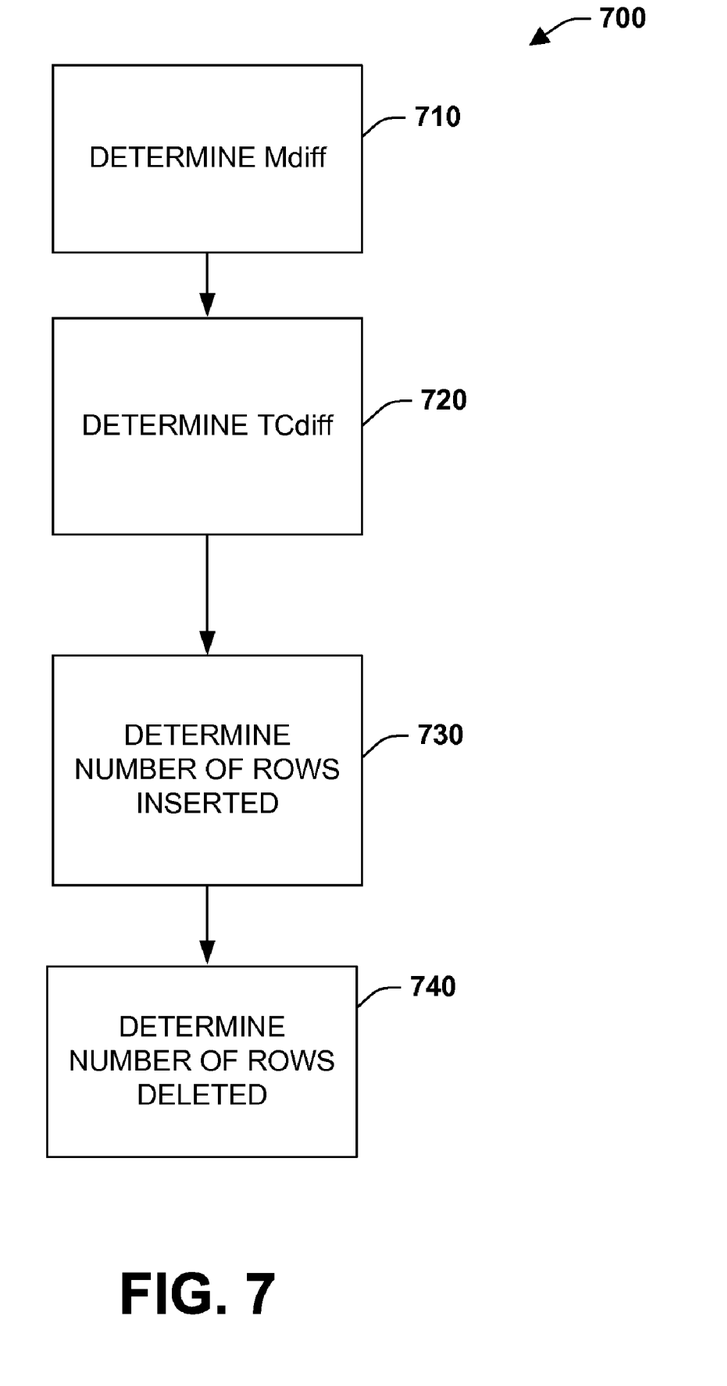
FIG. 7 illustrates an example data trend detection process.
Figure 8:
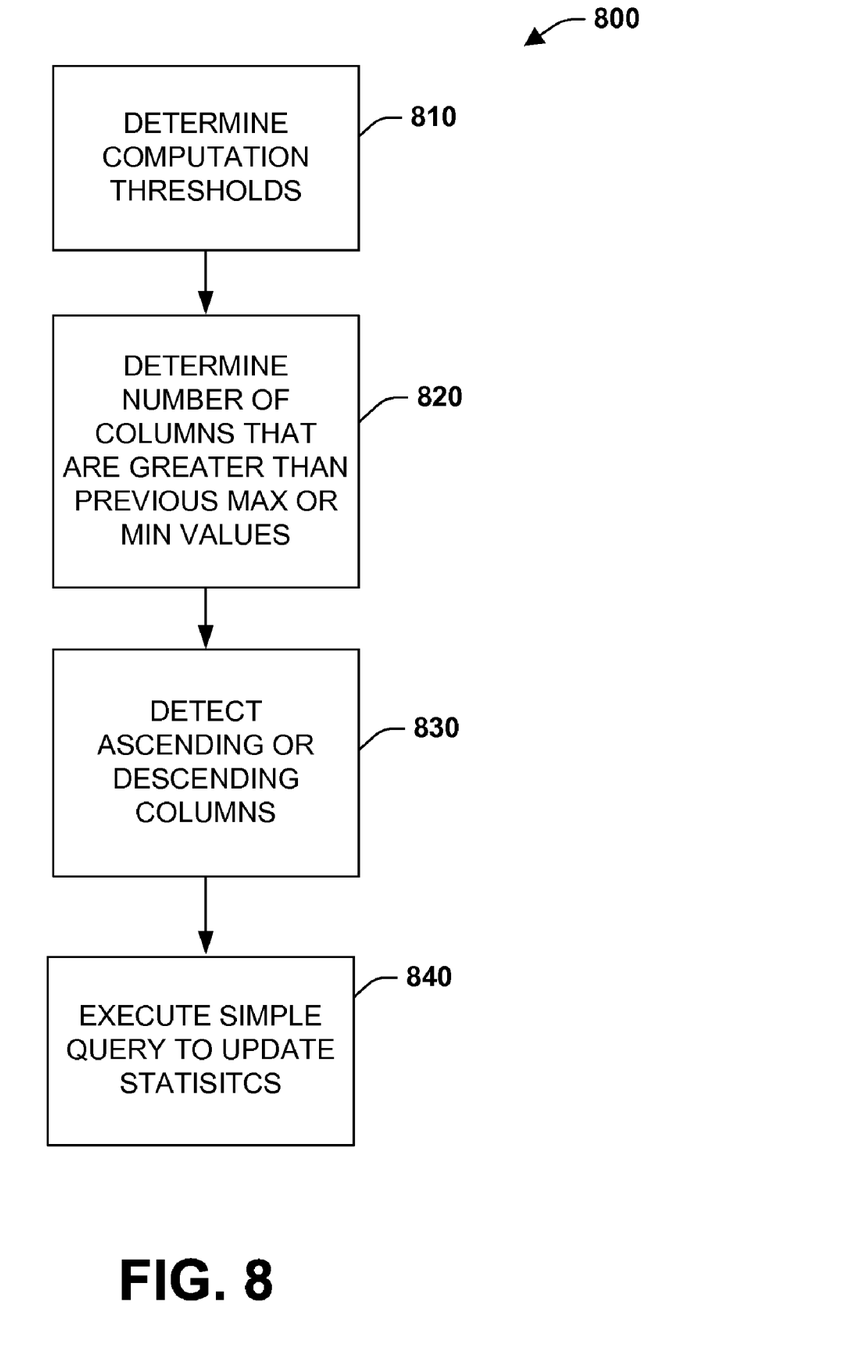
FIG. 8 illustrates an example statistics adjustment process.

FIG. 7 illustrates an example data detection process 700. Before proceeding, it is noted that the processes depicted in FIGS. 7 and 8 are exemplary in nature and that other computations, detections, and/or adjustments are possible.

To overcome the problem of statistical data possibly being stale or out of range, a detection of ascending or descending keys is determined. Before proceeding the following definitions can be applied:

DEFINITIONS $TC_i$—table cardinality when statistics where calculated the i-th time.

$M_i$—number of changes since table creation at the time statistics were calculated the i-th time.

$C_{max,i}$—maximum column value when statistics were calculated the i-th time. This could also include $C_{min,i}$—which is a minimum column value when statistics were calculated the i-th time.

From these definitions, calculate the following values:

Number of column changes between two consecutive statistics calculations at 710:

$$M_{diff} = M_{i+1} - M_i$$

Then at 720, determine the difference in table cardinality between at least two consecutive statistics calculation (note that this value can also be negative):

$$TC_{diff} = TC_{i+1} - TC_i$$

From these values $M_{diff}$ and $TC_{diff}$, determine or estimate the number of rows inserted at 730 and deleted at 740 between two (or more) consecutive statistics calculations:

$$Ins = (M_{diff} + TC_{diff})/2$$

$$Del = (M_{diff} - TC_{diff})/2$$

Turning now to FIG. 8, an example statistics adjustment process 800 is provided that is applied in accordance with the process 700. It is noted that the above formulas described for the process 700 can assume that updates are counted as two separate changes, one delete and one insert. Thus, let Gi+1 be the number of columns in the i+1-th histogram which are greater than Cmax,i, where Gi+1 can be derived by comparing the i-th and i+1-th histogram. At 810, computation thresholds are determined. This can include determining a maximum or minimum threshold number such as 0.9 for example, the number of times before declaring a trend in data, the number of insertions or deletions and so forth. At 820, a column is considered ascending, if over at least 3 statistics calculations, for example, more than 90% (or other threshold) of inserted values are above the previous calculations max value i.e., $$Gi+1/Ins > 0.9$$

For descending keys, track Li+1, the number of columns in the i+1-th histogram which are smaller than Cmin,i. A formula to detect descending keys is Li+1/Ins>0.9, i.e., more than 90% of all inserts are below the known minimum. If the query optimizer detects an ascending (or descending) key column, a simple query is issued at 840 to determine the current maximum (or minimum) value. This is generally performed if a supporting index exists. Thus, in the index case, it can be guaranteed that the calculation of the current maximum value is a "low cost" query (execution wise) which can be satisfied by a single index seek operation, for example.

In the case of ascending values, all inserts can be processed as though they came after the present distribution. In the case of descending keys, all inserts can be processed as though they came before the present distribution. Deletes can be processed as though they are evenly distributed through the distribution including the newly added values. As noted above, the processes described herein can be extended to determine a current low value and values found to be absent at the other end of the range can be used to reduce the number of deletes applied generally through the remaining distribution. This extension can be applied in the case of tables acting as queues where data is added at the end and deleted at the beginning, for example.

Figure 9:
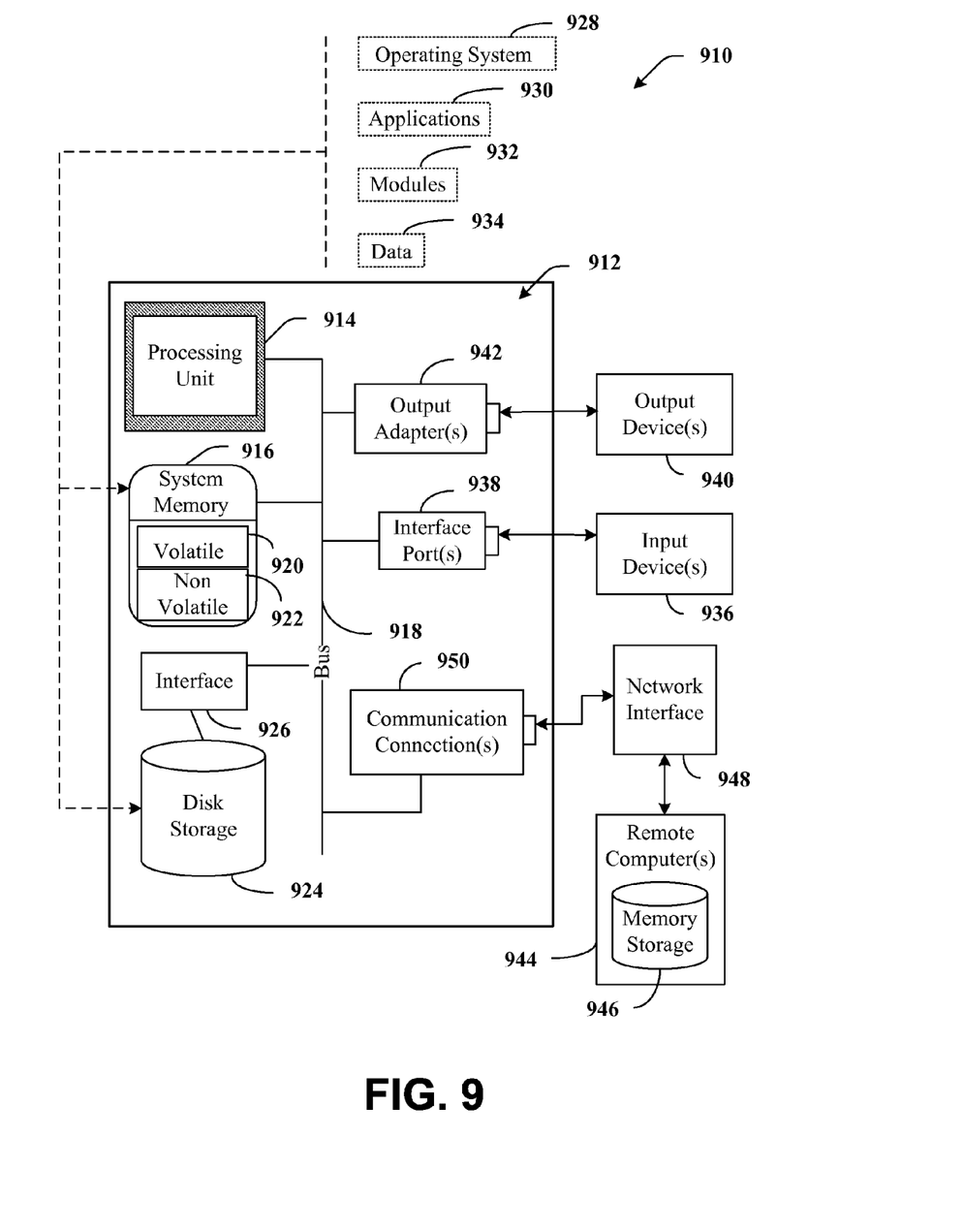
FIG. 9 is a schematic block diagram illustrating a suitable operating environment.
Figure 10:
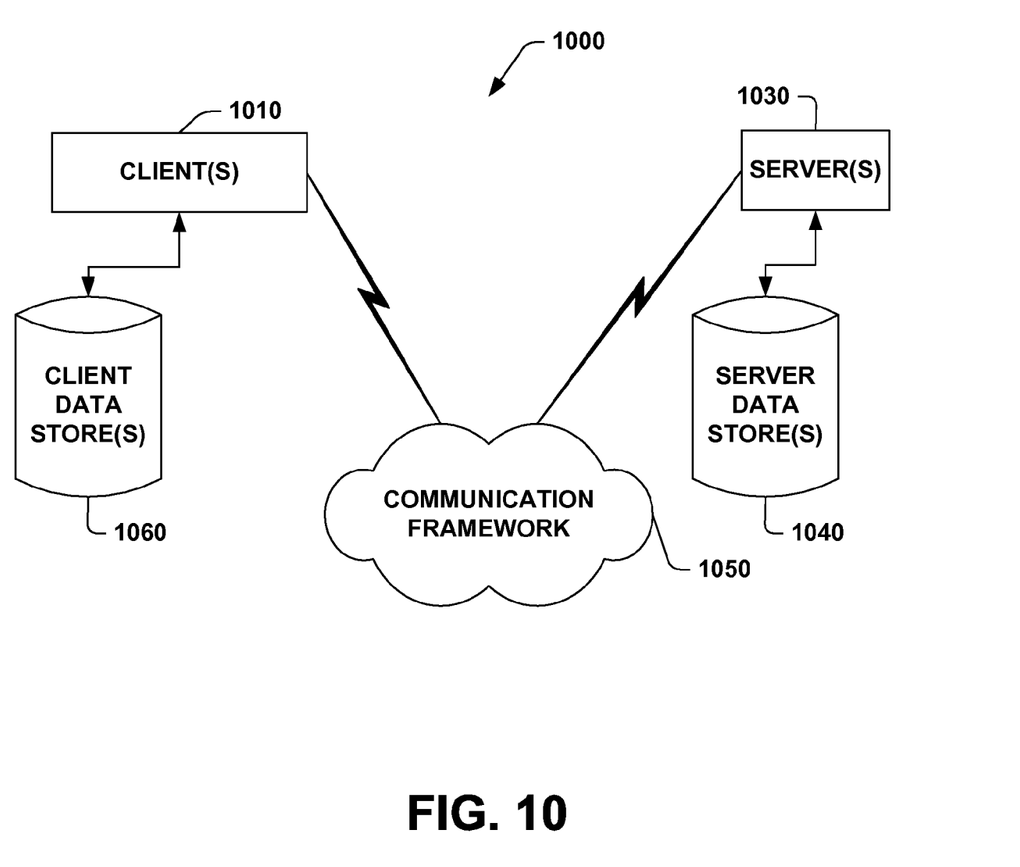
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer executable query execution system, comprising:
    a processor configured to execute the following computer executable components stored in memory:
        a monitor component configured to detect columns of a database comprising data having an ascending quality or a descending quality, wherein the monitor component is further configured to tag detected columns as ascending columns or descending columns; and
        an adjustment component configured to retrieve a current maximum value from a descending column or a current minimum value from an ascending column based on an intermediate query performed exclusively on tagged columns, wherein the adjustment component is further configured to ascertain a cardinality estimation corresponding to at least one of the tagged columns based on the intermediate query, and wherein the adjustment component is configured to apply at least one of the current maximum value to statistics associated with the descending column or the current minimum value to statistics associated with the ascending column.

2. The system of claim 1, wherein the monitor component is configured to count a number of data value changes in at least one of the tagged columns, and wherein the monitor component is configured to detect whether the number of data value changes in the at least one tagged column is greater than a given threshold.

3. The system of claim 2, further comprising a query plan optimizer configured to employ the adjustment component to perform the intermediate query before computing a query optimization plan.

4. The system of claim 1, wherein the monitor component is configured to execute during a query statistics refresh operation.

5. The system of claim 1, the monitor component further configured to detect data value changes in the tagged columns by detecting:
- a number of column changes between at least two consecutive statistics calculations;
- a difference in table cardinality between at least two consecutive table cardinalities corresponding to at least two consecutive statistics calculations;
- a number of rows inserted; and
- a number of rows deleted.

6. The system of claim 5, wherein the monitor component is configured to detect ascending or descending data value changes by employing the following equations, whereby:
- an ascending data value change is found if the following inequality is satisfied: $G_{i+1}/\text{Ins}>\text{Threshold}$, where Threshold is a computation threshold that is set by the monitor component, and $G_{i+1}$ is a number of columns which are greater than $C_{max,i}$ where $C_{max,i}$ is a current maximum value from a previous calculation;
- a descending data value change is found if the following inequality is satisfied: $L_{i+1}/\text{Ins}>\text{Threshold}$, where Threshold is a computation threshold that is set by the monitor component, and $L_{i+1}$ is a number of columns which are less than $C_{min,i}$ where $C_{min,i}$ is a current minimum value from a previous calculation; and
- the adjustment component is configured to execute a simple query to determine a new maximum ("$C_{max,i+1}$") or minimum value ("$C_{min,i+1}$") in response to a detected ascending or descending data value change.

7. The system of claim 1, further comprising a user interface configured to interact with the monitor component and the adjustment component.

8. A method for query optimization, comprising:
employing a processor to execute the following computer executable acts:
- sampling data stored in a plurality of database columns over time to determine an ascending trend or a descending trend in at least one of the plurality of database columns;
- labeling the at least one database column based on whether the ascending trend exists or whether the descending trend exists;
- retrieving a current maximum value from a descending column or a current minimum value from an ascending column based on an intermediate query executed exclusively on the at least one database column, wherein a cardinality estimation corresponding to the at least one database column is ascertained from the intermediate query; and
- applying the current maximum value to statistics associated with the descending column or applying the current minimum value to statistics associated with the ascending column.

9. The method of claim 8, further comprising determining the ascending trend or the descending trend in the database columns in view of one or more thresholds, where at least one threshold indicates a number of times data value changes have occurred outside of a given range.

10. The method of claim 8, further comprising employing the intermediate query to perform an update on statistics associated with a relational database.

11. The method of claim 10, the statistics are associated with a histogram.

12. The method of claim 10, further comprising employing the update with a query optimizer.

13. The method of claim 8, the sampling a plurality of database columns comprising:
- determining a number of column changes between two consecutive statistics calculations;
- determining a difference in table cardinality between at least two consecutive statistics calculations;
- estimating a number of rows inserted; and
- estimating a number of rows deleted.

14. The method of claim 13, further comprising:
- setting a computation threshold;
- determining a number of columns that are greater than a previous maximum value;
- determining a number of columns that are less than a previous minimum value;
- detecting ascending columns utilizing the number of columns greater than a pervious maximum, the number of rows inserted and the computation threshold;
- detecting descending columns utilizing the number of columns less than a previous minimum, the number of rows inserted and the computation threshold; and
- executing a query to update statistics to determine a new maximum value and a new minimum value.

15. A computer-readable storage medium, comprising:
computer-readable instructions, the computer-readable instructions including instructions for causing at least one processor to perform the following acts:
- comparing stored column statistics with column data retrieved from a statistics refresh operation;
- determining whether the comparison is outside of a known range;
- monitoring the column data over time to determine whether an ascending or descending trend is present in the column data in view of one or more thresholds, where at least one threshold indicates a number of times data value changes have occurred outside of a given range;
- flagging a column to indicate an ascending trend or a descending trend in the column;
- retrieving a current maximum value from a descending column or a current minimum value from an ascending column based on an intermediate query executed exclusively on the column, wherein a cardinality estimation corresponding to the column is ascertained based on the intermediate query; and
- adjusting column statistics in view of the ascending trend or the descending trend observed in the column, wherein the column statistics are adjusted based on applying the current maximum value to statistics associated with the descending column or applying the current minimum value to statistics associated with the ascending column.

* * * * *